United States Patent [19]

Billett

[11] Patent Number: 5,244,435
[45] Date of Patent: Sep. 14, 1993

[54] REVERSING AXES BELT STEERING PULLEY

[76] Inventor: Ronald Billett, 849 Durshire Way, Sunnyvale, Calif. 94087

[21] Appl. No.: 920,101

[22] Filed: Jul. 24, 1992

[51] Int. Cl.⁵ .............................................. F16H 7/00
[52] U.S. Cl. .................................................. 474/184
[58] Field of Search ............... 474/166, 167, 184, 188; 26/97–102, 63

[56] References Cited

U.S. PATENT DOCUMENTS

| | | | |
|---|---|---|---|
| 1,540,588 | 6/1925 | Alexander | 474/184 X |
| 1,738,700 | 12/1929 | Hadwin | 26/97 X |
| 3,392,431 | 7/1968 | Bisang | 26/63 |
| 4,592,463 | 6/1986 | Puskar | 474/184 |

*Primary Examiner*—Thuy M. Bui

[57] ABSTRACT

A cylindrical pulley over which a belt or web is looped is composed of a series of flat, annular discs, each of which rotates about its own individual axis, all discs closely adjacent to its neighbors so that the aggregate of discs forms the cylindrical pulley. All rotating disc axes are parallel and all are inclined at a chosen angle to the aggregate pulley axis creating a belt contact surface that moves laterally as well as peripherally. All discs revolve about bearing carriers that are rotated together in outboard bearings to change the orientation of the angled discs with respect to the traveling belt. Thus a belt wrapped about the pulley can be made to move in a direction perpendicular to its travel direction at a rate defined by the degree to which the individual discs deviate from the aggregate pulley axis. More importantly the belt can be made to reverse its direction of lateral travel by opposite positioning of the disc carrier group for which purpose several operating means are shown.

9 Claims, 5 Drawing Sheets

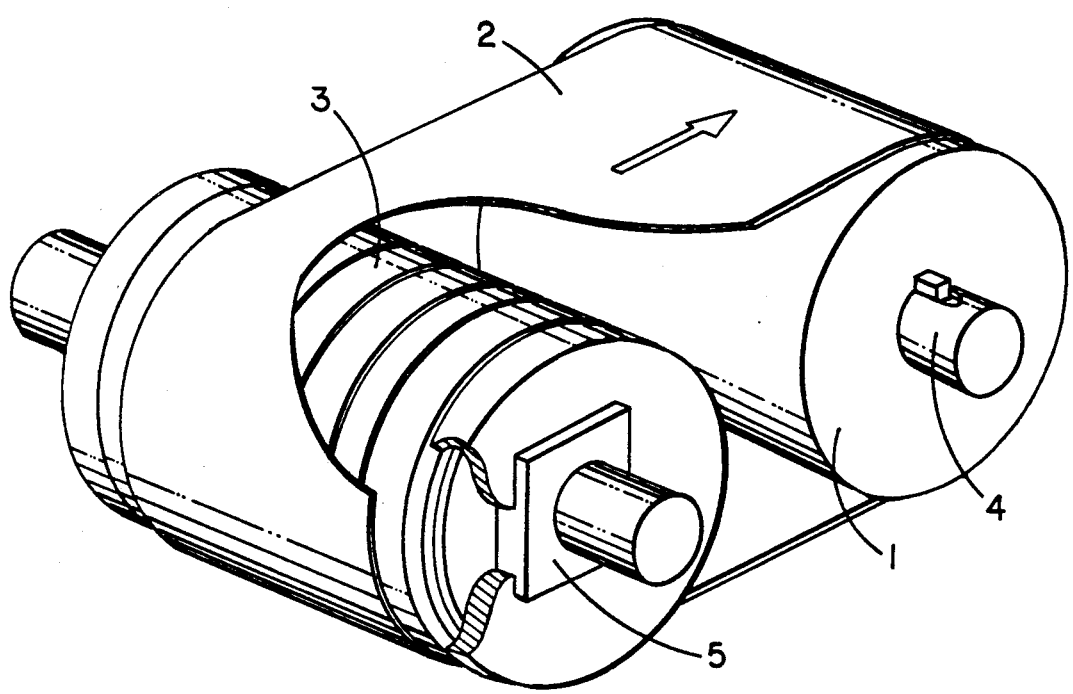
FIG_1

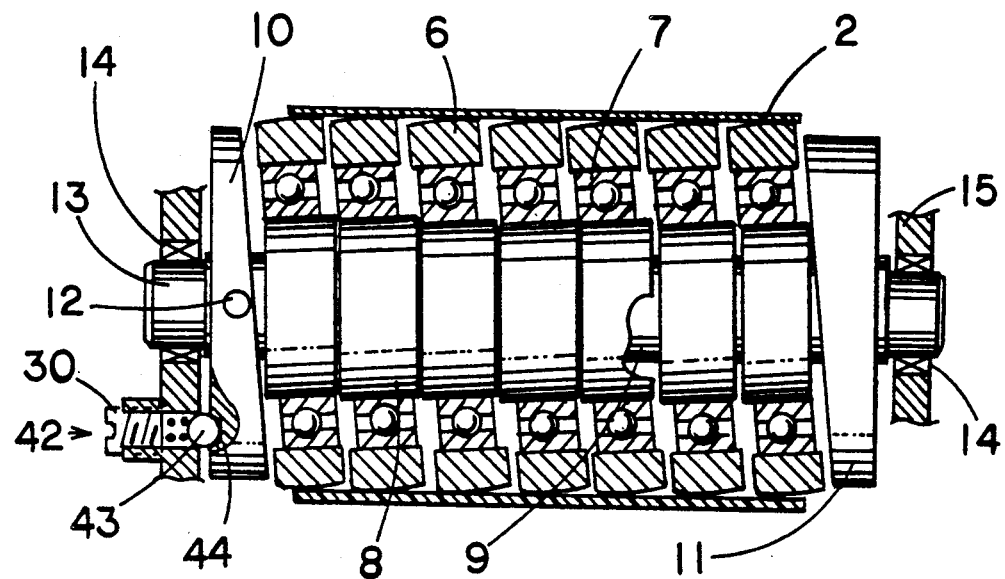
FIG_2
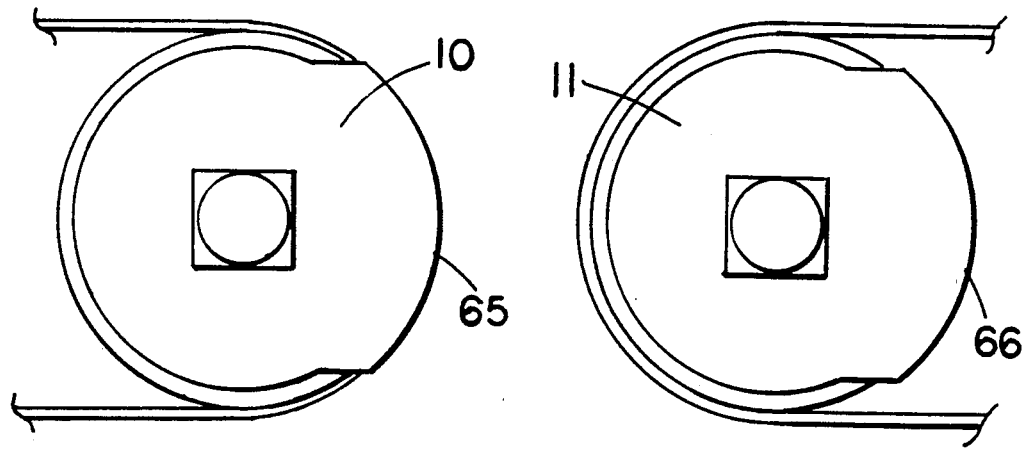
FIG_3   FIG_4

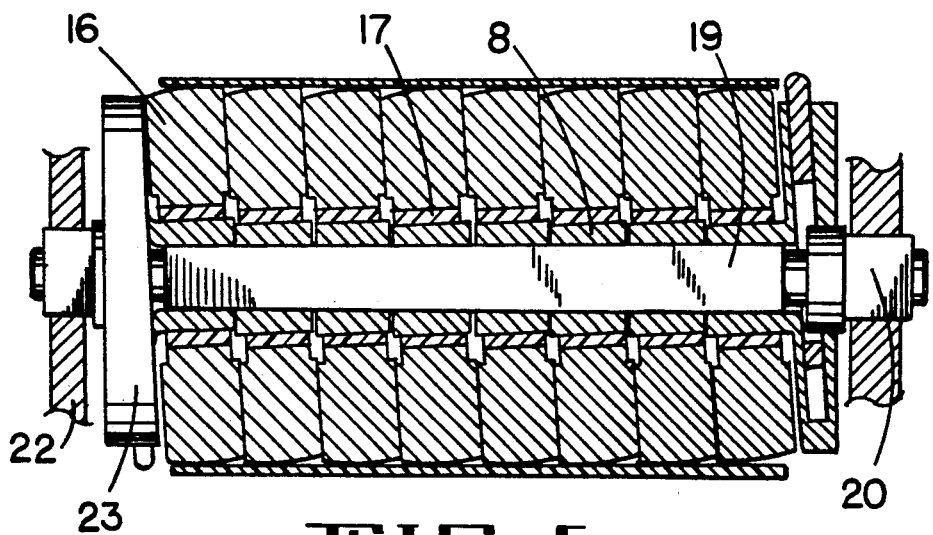
FIG_5
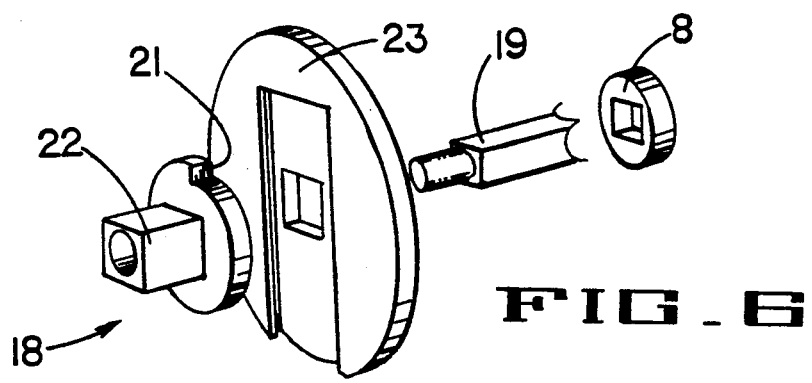
FIG_6
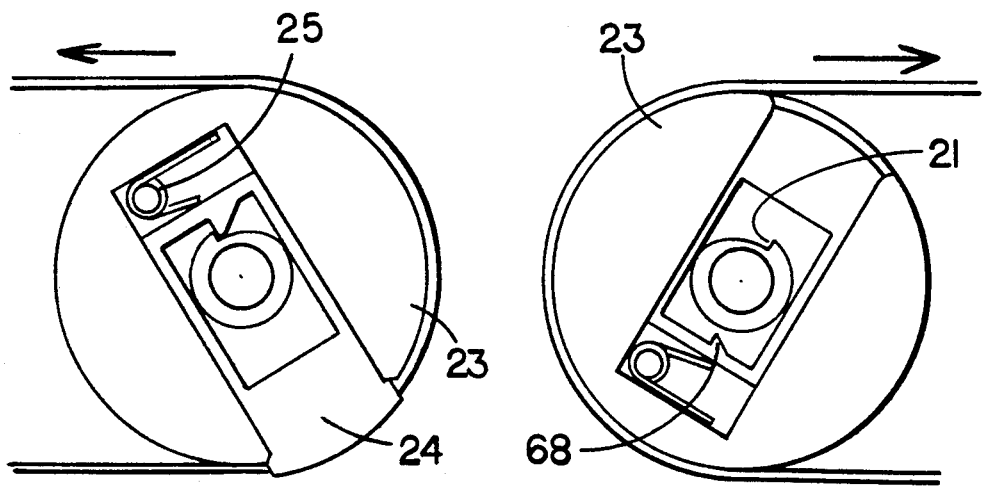
FIG_7  FIG_8

FIG_9
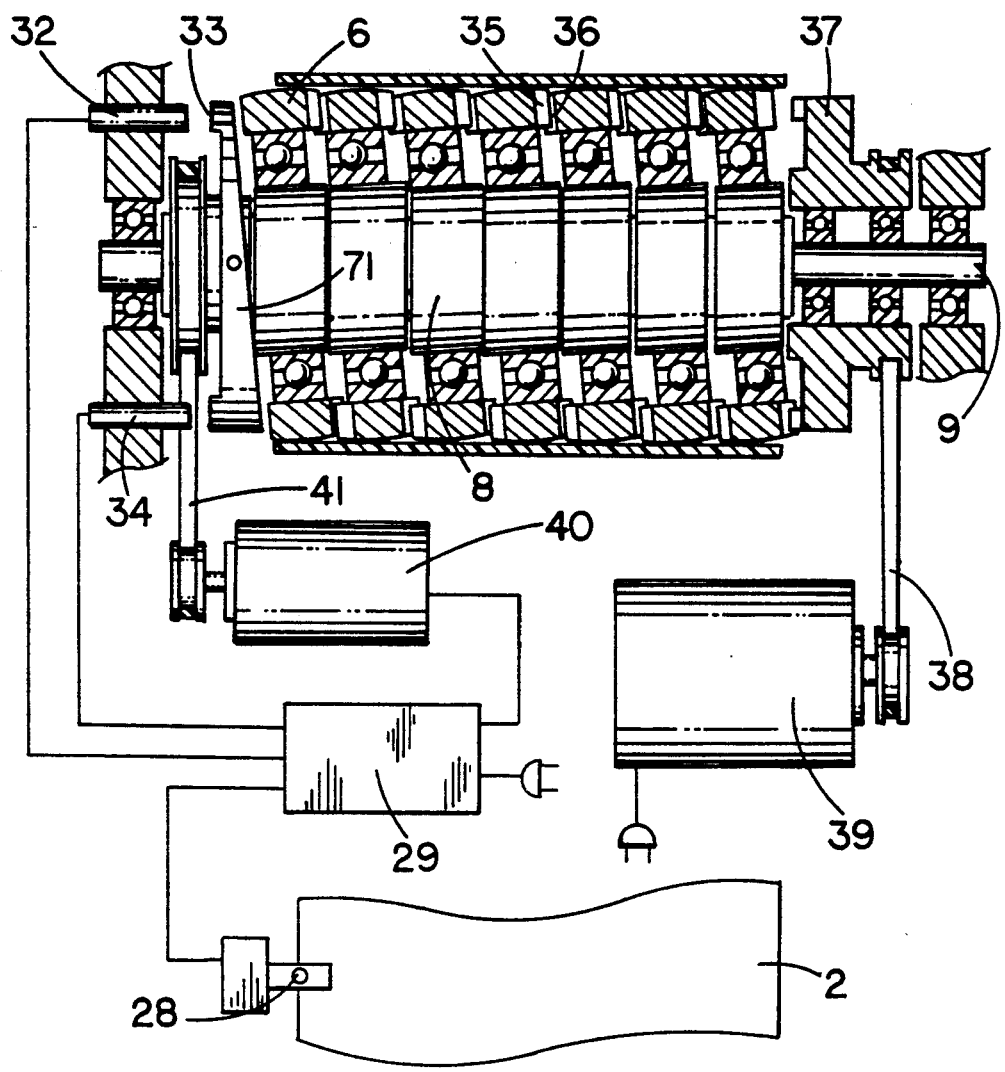
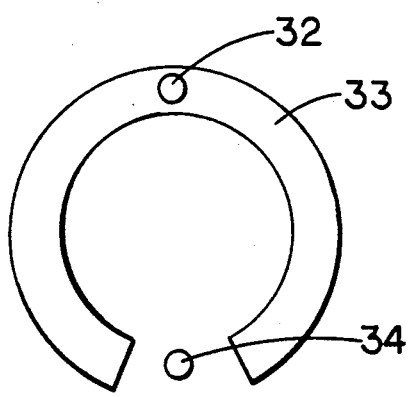
FIG_9a
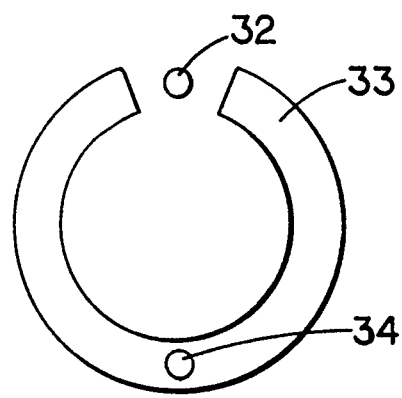
FIG_9b

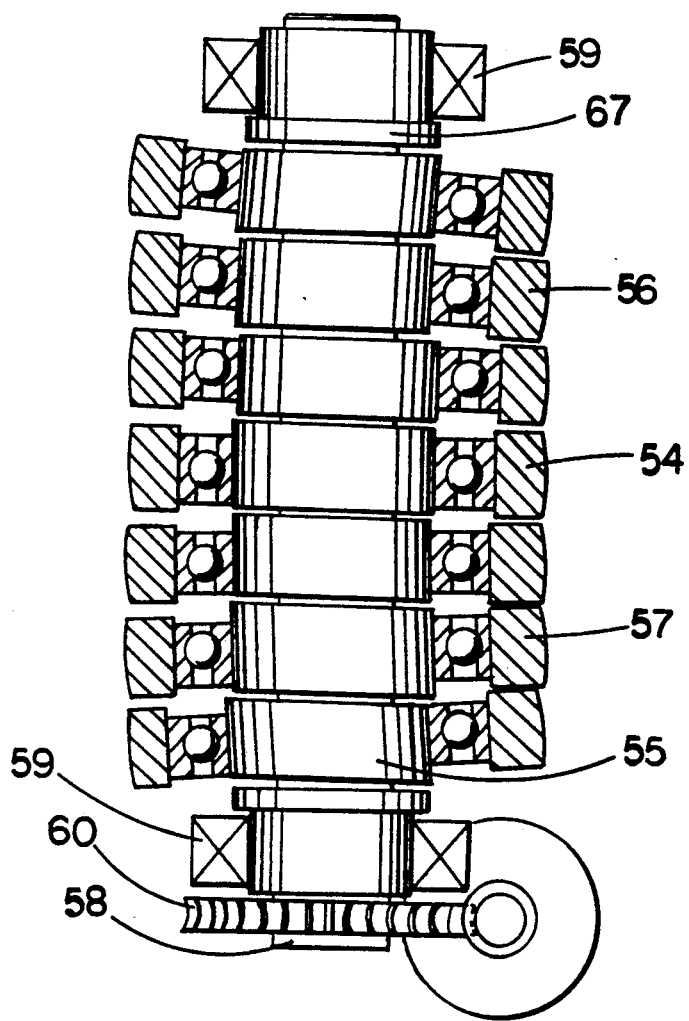
FIG_10
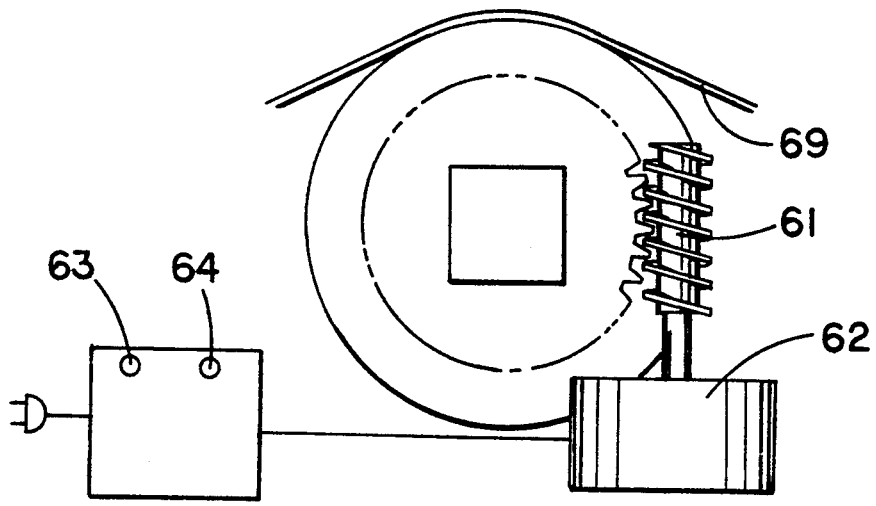
FIG 11

REVERSING AXES BELT STEERING PULLEY

BACKGROUND OF THE INVENTION

1. Field of the Invention

This invention is in the field of wide flat belts or webs that run over pulleys. The pulley is the element in the system that both drives the belt and causes it to run in the desired direction, and such a pulley is the subject of the invention.

Wide, flat belts find many industrial applications throughout industry, usually for the transfer of materials. In most common usage the belt is endless and is generally trained over two or more pulleys which lead it in the desired loop path. For satisfactory operation it is required that the belt remain running on the pulleys without walking off in either the left or right direction to the point where it will become damaged by contact with stationary frame members. Unfortunately, due to practical considerations in the manufacture of both belts and pulleys, dimensional inaccuracies are almost always present. Such imperfections that may go unnoticed in an open ended system become important when the error is repeated endlessly in the same direction, as in a cycling system of which the pulley/belt is an example.

Thus in any real system the pulleys will require periodic adjustment in order to prevent offrunning of the belt, with subsequent belt damage. Contact with frame members will not only damage the belt but may overload the drive system elements to the point of failure.

In spite of the difficulty in using wide and short belts they are indispensable in industry finding wide application in such diverse uses as belt sanders, material conveyors, and treadmills. Because of these commercial uses many devices have been introduced to assist in assuring that these wide belts run satisfactorily.

2. Prior Art

One way to prevent a wide belt from walking completely off one side of a pulley is to add an edge flange to the pulley. As long as the flange is high enough that the running belt cannot climb over it, then this means is effective in keeping the belt on the pulley. However the belt will be gradually damaged on the rubbing edge due to high force contact with the flange.

'V' belts, which run in deep grooves, track without problems, therefore a common practice is to attach a 'V' belt to the pulley side of a wide flat belt running in a mating 'V' groove in the pulley. This means takes advantage of the fact that the 'V' belt is locked firmly in its groove. A common result however, is that the sideways movement of the wide flat belt is so powerful that it drags hard against the 'V' belt either breaking the bond, or fracturing the flat belt in the process. When the belt is long enough rollers are sometimes used on the lower slack side to guide the belt into the desired path by bearing against the belt edges. Again, damage to the belt can and does result.

Belt training pulleys are often made with raised helical lands on the surface which appear to act on the belt by collapsing toward the pulley centerline under the belt load, thereby carrying the belt in the flexing direction toward the running centerline. To permit the device to work in both directions one half of the pulley has lands helical in one direction and the other half in the opposite. Thus the centering force is expected to be higher on the side of runoff, thereby urging the belt back toward the centerline. However the force is weak when compared to runoff forces and rarely assures proper tracking.

In cases where the belt is long when compared to its width satisfactory belt tracking is often accomplished by crowning one or both of the end pulleys upon which the belt runs. Crowning presents an angled support surface to the belt as it wanders off either to the right or left. The length and narrowness of the belt allow it to turn and meet the angled pulley surface. When this occurs the belt experiences a drag force which moves the belt back toward the running centerline of the pulley. In the case where the belt is wide when compared to its length, such turning across the width does not occur and the belt will continue to run toward one side or the other, as dictated by the belt dimensions and pulley orientation.

OBJECTS OF INVENTION

1. The first object of the invention is to provide a pulley that will exert a sideways force on a belt running over the pulley to cause it to move axially of the pulley in either a left or right hand direction as desired.

2. A second object is to incorporate a means in the pulley structure to respond to an undesired offcentered position of the belt upon the pulley and change the pulley orientation to cause axial movement of the belt away from the pulley edges and toward the pulley centerline.

3. A third object is to provide a belt steering means that will move a belt in a desired direction by providing force across its entire width rather than bearing against the edge of the belt which will cause damage to the belt because of the localized contact.

4. A fourth object is to provide a belt steering means that fits readily within the web, the pulley, and its mounting structure without protruding operating elements.

5. A fifth object is to provide a belt steering roller that in one mode can operate automatically in response to a misposition of the belt without external operating means.

6. A sixth object is to provide a belt steering means that can function to train the running web toward the pulley centerline when commanded by a signal from a position sensor that perceives the belt edge.

7. A seventh object is to utilize the unique construction of the pully of the invention to provide a means that can move a running belt axially of the training pully in both left and right directions simultaneously, thereby stretching the web incrementally across its width and with the degree of stretch under outside rota motion control.

SUMMARY

The present invention presents a method of manipulating the direction of a be as it runs over the partial perpheral surface of a guiding pully.

In its form the invention is a pully comprised of a series of similar diameter and similar thickness annular discs grouped together in a stacked array to make up the cylindrical body of a roller or pully around which a traveling belt is looped. Each of the annular discs is provided with its own axis of rotation w is different from the general rotational axis of the assembled pully. A special control means is provided so that if the belt has moved away from the centerline and toward an edge of the pully the array of discs can be reangled so as to urge the belt back toward the centerline of the system. The belt is thereby prevented from continuing to run off the pulley edge and perhaps suffering damage from contact with stationary supports.

BRIEF DESCRIPTION OF THE DRAWINGS

FIG. 1 is an isometric view of the invention shown in contact with a driver pulley and looped belt and angle control means.

FIG. 2 is an illustration of the pully showing the multi-axis multi-disc construction, each disc having anti-friction bearings, with friction actuated directional control means.

FIG. 3 is an end view of the pulley in FIG. 2 from the left side.

FIG. 4 is an end view of the pulley in FIG. 2 taken from the right side.

FIG. 5 is the same annular pulley with each disc of the pully running about its individual axis, this time using bearing bushings, and having latching control means.

FIG. 6 is an exploded view of the latch mechanism of FIG. 5.

FIG. 7 is a left hand end view of the pulley of FIG. 5.

FIG. 8 is a right hand end view of the pulley in FIG. 5.

FIG. 9 illustrates the multi-axis pulley equipped with a belt sensing means coupled to a tracking control means, also showing discs with interlocking teeth.

FIGS. 9a and 9b show the relative locations of a signaling member and a pair of sensors.

FIG. 10 is a plan view of a controlled position multi-axis pulley with each disc running in slightly different directions for use in the special situation of belt stretching to eliminate running creases, disc angles being controlled as before.

FIG 11 is an end view of the pulley in FIG. 12 showing a motorized means of adjusting the disc angles which control the degree of stretch.

DESCRIPTION OF THE INVENTION

Structure

A combination of two pulleys and a single looped belt as shown in FIG. 1, comprise a simple running belt system. The head pulley 1 may be supported on internal bearings, or on a rotating shaft. If the head is the driver pulley then it may be internally motorized or may be connected to an external power source through a drive chain. The belt 2, the working member of the group, runs around both pulleys in a looped path that is defined by the pulleys. The belt may be used to transport materials along its length, or in the proportions shown it may be used as a carrier of abrasives for use in sanding. A second pulley 3, which is the subject of this invention, completes the system. As shown, the head pulley 1, is supported in an external bearing. The tail or steering pulley 3, is supported through a selectively rotated shaft in an outer frame member, with each of its annular individually rotating discs 3, being supported by control shaft 5, and each running on individual bearings. The controlled angle multi-disc construction of the pulley which may be used to control the belt path is the subject matter of the present invention.

As defined by this invention, pulley 3 is made up of many similarly shaped annular discs with parallel sides, all being stacked together in an adjacent array to form a cylindrical pulley of the width required to support the belt. Each disc in the array is supported on its own angled carrier, the group of carriers being rotatable to govern the direction of the discs with respect to the running belt.

Friction directional control means

Now referring to FIG. 2, the sketch shows an end-on view with the belt approaching at the bottom and receding at the top. The belt 2 is shown cut through at the targent point of contact with the pulley to reveal the pulley structure. The multiple annular discs which make up the pulley structure are also shown in a section view. All of the discs in this embodiment are positioned at the same angle with respect to an overall pulley axis perpendicular to the direction of belt travel.

For structural reasons each disc 6, is pressed onto a ball type bearing 7. In turn, each bearing is pressed onto a carrier 8 which has a square or otherwise keyed hole broached through at an angle to the bearing bore. The faces of the carriers are ground perpendicular to the bore. All carriers with bearings and annular discs in place are pressed onto a mating square or keyed support member 9, in suffifient number to form the complete web carrying pulley. Note that the bearings must be narrower than the carrier width to prevent interference with neighboring bearings. At each end of the assembled discs, drag-plates, 10 and 11, are mounted on the same square or keyed shaft 9, each located axially on the throughgoing support member by a pin 12.

In FIG. 3 drag-plate 10 has a raised land 65 on its periphery. Drag-plate 11, FIG. 4, also has a raised land 66 on its perphery. The land are just high enough to be contacted by the belt without protruding excessively in a manner which might damage the belt. The land on dragplate 10 is 180 degrees displaced around the connector shaft from the land on dragplate 11 and each land occupies approximately one quarter of the circumference. Each drag-plate is shaped to lie snugly against the side of the adjacent disc carrier 8, while allowing the disc 6 to rotate freely. Contrast between the adjacent carries determines the axial spacing of all elements.

The support member 9 has cylindrical extensions 13 at each end. Each extension is carried in a bearing 14, which is in turn carried in a suitable frame member such as 15.

To locate the drag plate and its assembled carries in a generally correct position with respect to the running belt, a detent device such as 42, have a locating ball or roller 43, is used. The ball cooperates with a cavity 44 in the drag plate. Instead of a detent, a brake and pad device could be used since an exact position is not required for satisfactory operation. Use of an adjusting screw 30 permits a level of holding force to be applied that will resist the frictional drag of the bearings 7, yet will break free when the belt wraps over either of the drag plate lands 65 or 66.

Operation

The pulley as heretofore described is used in the context of a belt and pulley system as illustrated in FIG. 1. FIG. 2 shows a conventional arrangement where the belt arrives at the pully at its lower surface at the point shown by the head-on arrow. The belt moves onto the pulley surface which is primarily moving in the belt direction and at belt speed. Because of their angled orientation the surface of each of the discs comprising the pulley moves laterally through a small dimension over the 180 degrees during which the belt is in contact. Thus the belt is laterally distorted by the discs so that it leaves the pulley at the point shown by the tail-on arrow slightly displaced laterally from its incoming position. The angle has been greatly exaggerated to clarify the function.

After many revolutions of the pulleys the belt will creep far enough to the side, in the direction set by the angled carriers, so that it will contact the raised surface 65 of the dragplate 10. The dragplate and connected shaft are free to rotate in the bearings 14. As the dragplate becomes driven by the belt it rotates all carriers 8 together through the keying action of the pin 12 and the square support member 9. All discs follow their carriers and move such that the angle of each disc from the true perpendicular on that portion of the periphery contacted by the belt will diminish and the belt will not be carried as positively toward the side as in the previous condition. As the belt continues to rotate the dragplate its raised surface passes out from under the impelling belt. When the shaft reaches this point, all carriers will be turned through 180 degrees and therefore all discs will be inclined in the opposite direction and thus the belt will be slowly carried to the opposite side of the pulley where the raised land 66 of dragplate 11 is now in position to be contacted by the belt when it arrives. While exact positioning of the assembly is not necessary the dragplate should turn through approximately 180 degrees for best operation. The brake or detent system is sufficient to overcome bearing friction and stops the dragplate after this angle of motion.

Latching Directional Means—Structure

In some cases the belt is made of a material, such as steel, that cannot accommodate the slight stretch required to flex over the raised surface of the endplate as just described. In this case the raised actuating surface can be depressed by the overriding belt in order to obviate the need for stretch. FIGS. 5, 6, 7, and 8, illustrate such a construction. Each of the discs 16 is carried with a press fit on a bearing made from any long-wearing material such as bronze or plastic 17. As in the previous construction the bearing 17 is a slip fit on the carrier 8 through which a center square hole has been broached. The carrier determines the angle from the perpendicular at which the disc is caused to run. All carriers and discs are assembled in close proximity onto a square sectioned support member 19. The last carrier may be made integral with, or otherwise connected to, a dragplate 23 carrying an operating member. On either end of the through support member are mounted latch members 18. Each latch member 18 carries a latch plate 20 which consists of a smooth almost cylindrical surface depressed in one area to form a latch 21. An integral extension of latch member 18 is shaped into a second square extention 26, which is mounted into a matching square hole in the support structure 22. The relationship of support member 19, dragplate 23, carriers 8, and latch member 18 are shown in FIG. 6. On the opposite end of the support member, latch member 18 is made in the reverse image. Corresponding latches on either end are spaced 180 degrees apart around support member 19. Dragplates 23, FIGS. 7 and 8, which are carried at each end of the cylindrical assembled pulley structure, each contain a sliding release plate 24 that surrounds the almost circular surface 20 of the latch member 18, and carries a mating pawl 68 which cooperates with the latch 21. The end of the release plate 24 opposite the pawl 68 is raised slightly above the pulley surface in a position to be intercepted by the belt as it moves too far toward the pulley edge. The release plate travel is defined by the surface 20 and by a spring 25 which impels the release plate into contact with the latch member, engaging the cooperating pawl and latch.

Operation

As the multi-axis steering pulley is driven by the belt, the frictional drag exhibited by the bearings 17 rotates the carrier, through support member 19, and dragplates 23 until one of the pawls 68 in one of the dragplates meets its mating latch 21 in latch member 18. The dragplate 23, support member 19 and all carriers then stop rotating and the belt bearing discs 16 rotate normally about their individual bearings 17.

With a particular latch engaged, the discs are consequently inclined at an angle to cause the belt to move toward that engaged side. As it runs about the pulley system the belt will slowly migrate toward that side which has the engaged latch. After the belt has moved far enough to move over the top of the endplate 23 the sliding release plate 24 becomes depressed by the belt releasing the latch from the pawl.

With the latch released the frictional drag of the bearings then rotates the entire pulley structure within the latch members 18 until after 180 degrees of travel the latch and pawl on the opposite side engage and stops dragplate, support member, and carrier rotation. In this new position the belt bearing discs are inclined opposite to their previous direction which, in consequence, causes the belt to move across the pulley in the opposite direction. Movement is always toward the engaged latch. Thus, as the belt is running, it moves cyclically from side to side on the multi-disc pulley with a frequency of cycling governed by the angle chosen for the carriers. When the belt is of low quality, with poorly controlled dimensions, the carrier angles will need to be relatively large and the belt will cycle rapidly. When the belt is of good quality with more carefully controlled dimensions then the angle may be small and the belt will cycle more slowly.

Remote control system

The previous paragraphs have discussed constructions of the multi-disc pulley which are self-controling. However it is also likely that a user might choose to operate a system wherein the lateral direction of travel of the belt is under remote control. FIG. 9 illustrates a typical arrangement that might be chosen from among the many schemes available for the purpose. The belt and pulley system is similar to that of previous embodiments with a driven head pulley 1, a belt 2, and a multi-axis tail pulley 3. An additional difference in this case is that for illustrative purposes the driving head pulley has been combined with the guidance pulley—a combination which will be discussed in a following paragraph.

Drive is from an outside drive motor 39 receiving power from a mains supply and transferring continuous rotary motion through a belt and sheave arrangement 38. A simple photocell 28 is used to signal the presence or absence of the belt at a given position. The photocell signal is received by a control system 29 also powered from a mains supply. The controller drives a positioning motor 40 whenever a change in the direction of lateral progression of the belt is required. The positioning motor 40 is coupled to the multi-axis pulley through a belt and sheave drive system 41. Two proximity sensors 32 and 34 FIGS. 9a and 9b, are located on the frame at 180 degree intervals about the multi-disc pulley endplate 71. A raised ring segment 33 is mounted on the endplate 71, to cause operation of the sensors. In cooperation with the photocell these sensors start or stop motion of the positioning drive 40 as the location of a gap in the ring segment 33 on the pulley endplate is sensed. Location of the gap in ring segment 33 opposite either sensor 32 or 34, signals to the controller the direction in which the annular discs 6 are angled.

In operation the multi-axis pulley will be in some position with the belt running about the path defining pulleys 1 and 2, with drive from motor 39 being delivered through drive train 38. The controller will seek the belt position as signaled by sensor 28. Either the belt sensor will find that the belt is within its perview or it will not. If the belt is present then the controller will initiate rotation of the multi-axis pulley together with its endplate 71, and with it all the disc carriers 8 to bring the gap in ring segment 33 to the position where all axes are angled appropriately to move the belt axially to uncover the sensor 28. When either sensor 32 or sensor 34 finds the gap in ring segment 33, the motor 40 is turned off and rotation of the carriers stops. In the new disc position as defined by the carriers, the discs will carry the belt laterally away from the belt sensor position. When the belt has moved far enough so that sensor 28 finds that the belt is not present, then motor 40 is started and rotation of the pulley core through 180 degrees is repeated. As before when the gap in ring segment 33 is located by sensors 32 or 34, rotation is stopped. The opposite direction of the discs will now carry the belt back to its original position. The system cycles periodically at a frequency depending on the angular inclination chosen for the disc array. A manual override may be provided to ensure that cycling is appropriately phased.

Many commercial controls will accomplish this relatively simple task, and are not part of this invention.

Use as a driven pulley

In some circumstances it may be required that either the head or the tail pulley combine the functions of being both the drive and the tracking pulley. Such a requirement is anticipated by the arrangement of FIG. 9. Each of the discs 6 is furnished with teeth 35 cut along radial lines which cooperate with similar teeth 36 in its neighbor disc. Sufficient clearance must exist between teeth to permit the angled discs to lie parallel to each other. The teeth will be in contact on the sides of the angled discs only, and spaced apart on the top and bottom of the discs where the belt makes its tangential contact. The endplate on one side 37 is also furnished with similarly cut cooperating teeth. Since the annular discs 6 are at a slight angle with respect to the support member 9, and since the face of drive plate 37 is exactly perpendicular to support member 9, full tooth engagement between the outer of the discs 6 and the end plate 37 will occur at only one point on the disc perimeters. The end plate 37 is coupled through a drive system 38 to a drive motor 39. When motor 39 turns, all discs rotate in unison, generally about the system centerline, but specifically about axes as determined by the bearing carriers 8. The angular position of the multi-discs, whether to the left or the right, is determined by a positioning motor 40 with a control system as previously described. The angular location of the contact point between end plate 37 and first carrier disc 6, will vary depending on the orientation chosen for support member 9.

Note that the interlocking teeth also serve to prevent belt fibers from pulling down between discs and tend to make the pulley surface continuous.

Multi-direction multi-axis discs

FIG. 10 illustrates a variation in the manner of construction of the multi-axis pulley in which the discs rotate about axes that are not only not parallel to the aggregate pulley axis, but are also not parallel to each other.

Each disc 54 is supported on its individual carrier 55 by means of a low friction bearing, as in previous examples of the multi-axis pulley. In turn each individual carrier is mounted on a square section or otherwise keyed cross-member 58. This cross-member shaft 58 is supported in a sleeve 67 which has a square inner hole to engage the crossmember and a circular outer surface to run against the bearing 59 in a rotatable manner. Each of the internal carriers is angled somewhat differently from its neighbor. Thus each of the discs will be rotating in a slightly different direction from that of its neighbors.

An application for this version of the pulley lies in the control of webs which need to be stretched in a crosswise manner, as referred to the web direction, to a variable degree. In this case the center disc 54 will have its particular rotating axis perpendicular to the web travel direction. The neighbor discs on either side 56, and 57, will have their respective axes angled one to the right and one to the left, each by a small degree. Other discs laying yet further from the center disc will have axes that are progressively slightly more angled. In this manner the full width of the web is placed in tension. By means of this cross web tension, creases may be ironed out of the web, as in running newsprint. In another use the web may be stretched to a thinner thickness dimension as in the case of continuously stretching a deformable plastic web material.

Referring to FIG. 11, it will be seen that in this application the web 58 is not expected to wrap around the pulley to a significant degree-probably not more than 60 degrees. Because of this narrow zone of contact it is possible to modify the individual angles through which each of the discs contacts the web by rotating the core shaft 58. In this way the degree to which the web is laterally stretched may be modified by rotating the assembly of discs. Thus, referring to FIG. 10, the square or keyed center crossmember 58 is passed through one of the wall support bearings 59 to a drive gear 60. This gear may be driven by a meshing spiral gear 61 attached to the shaft of a reversible motor 62. Chain or belt drives, or even air driven rack and gear arrangements, are also available to accomplish the same result. In use the operator may observe the web condition and drive the motor in one direction through a control switch 63 to increase the apparent stretch in the web, or drive the motor in a reverse direction through switch 64 in order to decrease the degree of apparent stretch. With a photoelectric scanner to monitor the web width the action can be automatic and capable of fast response to accommodate high web travel speeds.

CONCLUSION

It will be evident from a reading of the preceding specification that a means of constructing a web guiding pulley has been presented that achieves the result of tracking a belt in the desired path without allowing contact with any stationary supporting structure, which action can result in the eventual destruction of the belt itself. This is accomplished without causing unequal stress to be produced across the width, which can also result in belt failure. The combination of independently running stacked discs each mounted on a rotatable angled core piece, to reverse the tracking direction, has been shown to be amenable to several types of control means, some self-contained, some remote.

What is claimed is:

1. A cylindrical pulley which bears against and guides a thin flat flexible belt, the pulley comprised of a series of annular discs of similar diameters each able to rotate about an individual independent axis, each disc closely adjacent to a neighbor disc in a stacked array so that the aggregate of all discs forms a cylindrical body of the pulley, a individual axes of said discs each deviating slightly from an general pulley axis, said individual axes being parallel to each other, so that all deviate from said general pulley axis by the same small angle and with the same spatial orientation.

2. A cylindrical pulley which bears against and guides a thin flat flexible belt, the pulley comprised of a series of annular discs of similar diameters each able to rotate about its individual axis independently, each disc closely adjacent to a neighbor disc in a stacked array so that the aggregate of all discs forms the generally cylindrical body of the pulley, said discs mounted on angled carriers which constrain said discs to rotate about axes having the same spatial orientation, which axes deviate slightly from a main pulley axis, said carriers being angularly locked to a center support shaft rotatably mounted so that all carriers turn together when said support shaft is caused to rotate.

3. A pulley as in claim 2 having both left and right end portions of said support shaft affixed to dragplates which effectively cap the ends of the cylindrical pulley body and having diameters matching said general pulley diameter but with a portion less than 180 degrees of each dragplate peripheral surface raised above the overall pulley diameter to a position in which it will contact a belt wrapped over said pulley, said left and right partial raised surfaces being 180 degrees separated in angular position around said pulley axis.

4. A pulley with a rotatably mounted center support shaft as in claim 2, having means to resist angular motion of said support shaft at two predetermined angular positions of said support shaft relative to said flat flexible belt.

5. A pulley as in claim 2 having both left and right end portions of said support shaft affixed to pulley endplates having diameters matching said general pulley diameter, said endplates having similar latchplates mounted thereto, said latchplates able to move from a position below the aggregate pulley surface to a position protruding above the aggregate pulley surface where either one or the other latchplate may be depressed by contact with a wrapping belt to effect its release from a stationary pawl thereby allowing the support shaft and carriers to rotate as a group and which latchplate functions in the protruded position through an engagement with said pawl to lock the shaft and carrier group in a given angular position with respect to the wrapping belt, said left and right latchplates being angularly displaced 180 degrees about said shaft.

6. The pulley of claim 2 in which each of the individual discs comprising said pulley is so constrained by said angled carriers that each lies in a differently oriented plane with respect to said pulley axis.

7. A method of modifying the directional travel path of a belt running over a cylindrical pulley comprised of the steps of slicing said cylindrical pulley into narrow annular discs and angling each individual disc in the direction in which it is desired to direct the belt travel, with each individually rotating disc mounted on a separate bearing, the inner member of said bearing angularly locked to a common shaft, which itself can rotate in either direction to reorient the planes in which said discs are rotating.

8. The pulley of claim 2 in which each of the discs, which taken together form said pulley, has toothed projections on the sidewall surface which mesh with similar toothed projections on the adjacent sidewall of a neighbor disc so that when an end disc of the array is driven all will be driven, input to the end disc of the array being delivered by a similarly toothed drive gear whose axis is coincident with the general pulley axis thereby limiting contact between said drive gear and the end disc of the array of discs to one point.

9. The pulley of claim 2 functioning as an element in a belt and pulley system in which the angular position of said carrier support shaft is governed by the lateral position of said belt running over said pulley as determined by a sensor monitoring the lateral position of said belt.

* * * * *